(12) United States Patent
Salamah et al.

(10) Patent No.: US 7,443,066 B2
(45) Date of Patent: Oct. 28, 2008

(54) METHODS AND APPARATUS FOR COOLING WIND TURBINE GENERATORS

(75) Inventors: Samir A. Salamah, Niskayuna, NY (US); Aniruddha Dattatraya Gadre, Rexford, NY (US); Jivtesh Garg, Schenectady, NY (US); Bharat Sampathkumaran Bagepalli, Niskayuna, NY (US); Patrick Lee Jansen, Alplaus, NY (US); Ralph James Carl, Jr., Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 114 days.

(21) Appl. No.: 11/193,882

(22) Filed: Jul. 29, 2005

(65) Prior Publication Data

US 2007/0024132 A1    Feb. 1, 2007

(51) Int. Cl.
*H02K 1/32* (2006.01)

(52) U.S. Cl. .......................................... 310/64; 310/266

(58) Field of Classification Search .................. 310/64, 310/254, 266; 290/44–45
See application file for complete search history.

(56) References Cited

U.S. PATENT DOCUMENTS

| 6,483,199 | B2 * | 11/2002 | Umemoto et al. ............. 290/55 |
| 6,520,737 | B1 | 2/2003 | Fischer et al. |
| 7,057,305 | B2 * | 6/2006 | Kruger-Gotzmann et al. . 290/55 |
| 7,154,191 | B2 * | 12/2006 | Jansen et al. .................. 290/55 |
| 7,154,193 | B2 * | 12/2006 | Jansen et al. .................. 290/55 |

\* cited by examiner

*Primary Examiner*—Thanh Lam
(74) *Attorney, Agent, or Firm*—Armstrong Teasdale LLP (57) ABSTRACT

A wind turbine generator includes a stator having a core and a plurality of stator windings circumferentially spaced about a generator longitudinal axis. A rotor is rotatable about the generator longitudinal axis, and the rotor includes a plurality of magnetic elements coupled to the rotor and cooperating with the stator windings. The magnetic elements are configured to generate a magnetic field and the stator windings are configured to interact with the magnetic field to generate a voltage in the stator windings. A heat pipe assembly thermally engaging one of the stator and the rotor to dissipate heat generated in the stator or rotor.

17 Claims, 7 Drawing Sheets

METHODS AND APPARATUS FOR COOLING WIND TURBINE GENERATORS

STATEMENT REGARDING FEDERALLY SPONSORED RESEARCH & DEVELOPMENT

The U.S. Government has certain rights in this invention as provided for by the terms of NREL Subcontract No. NREL-ZAM-4-31235-05, Prime Contract DE-AC36-99GO10337 awarded by the Department of Energy.

BACKGROUND OF THE INVENTION

This invention relates generally to wind turbine generators, and more particularly, to methods and apparatus for cooling wind turbine generators.

Recently, wind turbines have received increased attention as an environmentally safe and relatively inexpensive alternative energy source. With this growing interest, considerable efforts have been made to develop wind turbines that are reliable and efficient.

Generally, a wind turbine includes a plurality of blades coupled to a rotor through a hub. The rotor is mounted within a housing or nacelle, which is positioned on top of a tubular tower or base. Utility grade wind turbines (i.e., wind turbines designed to provide electrical power to a utility grid) can have large rotors (e.g., 30 or more meters in diameter). Blades on these rotors transform wind energy into a rotational torque or force that drives the rotor of one or more generators, rotationally coupled to the rotor. The rotor is supported by the tower through a bearing that includes a fixed portion coupled to a rotatable portion. The bearing is subject to a plurality of loads including a weight of the rotor, a moment load of the rotor that is cantilevered from the bearing, asymmetric loads, such as, horizontal wind shears, yaw misalignment, and natural turbulence In the generator, rotor components and stator components are separated by an airgap. During operation, a magnetic field generated by permanent magnets and/or wound poles mounted on the rotor passes through the airgap between the rotor and the stator. The stator includes a core and a coil surrounding the core. The magnets induce a current in the core and coil to generate electricity.

However, when the electricity is generated in the core and coil, the core and coil generate a significant amount of heat. Heat is also generated in the rotor and the magnets. Conventional cooling systems for the generator components include air cooled ventilation systems and water cooled systems. These conventional systems are typically complex and require additional components to facilitate cooling. Additionally, these conventional systems require maintenance and power to operate. These factors add cost to the operation of the generator.

BRIEF DESCRIPTION OF THE INVENTION

In one aspect, a wind turbine generator is provided including a stator having a core and a plurality of stator windings circumferentially spaced about a generator longitudinal axis. A rotor is rotatable about the generator longitudinal axis, and the rotor includes a plurality of magnetic elements coupled to the rotor and cooperating with the stator windings. The magnetic elements are configured to generate a magnetic field and the stator windings are configured to interact with the magnetic field to generate a voltage in the stator windings. A heat pipe assembly thermally engaging one of the stator and the rotor to dissipate heat generated in the stator or rotor.

In another aspect, a generator for a wind turbine is provided including a stator core, and a plurality of coils coupled to the core. The coils are configured to generate an electrical output of the generator. A heat pipe assembly thermally engages at least one of the core and the plurality of coils. The heat pipe assembly is configured to dissipate heat generated in the core and the plurality of coils.

In a further aspect, a method of assembling a wind turbine generator is provided. The method includes coupling a stator core to a stator, wherein the stator core includes a plurality of stator windings being spaced circumferentially about a longitudinal axis of the generator. The method also includes coupling a rotor to the stator such that the rotor is rotatable about the generator longitudinal axis. The rotor includes a plurality of magnetic elements configured to interact with the stator windings to generate an electrical output of the generator. The method also includes coupling a heat pipe assembly to one of the stator and the rotor to dissipate the heat generated in the heat pipe assembly.

DETAILED DESCRIPTION OF THE INVENTION

Figure 1:
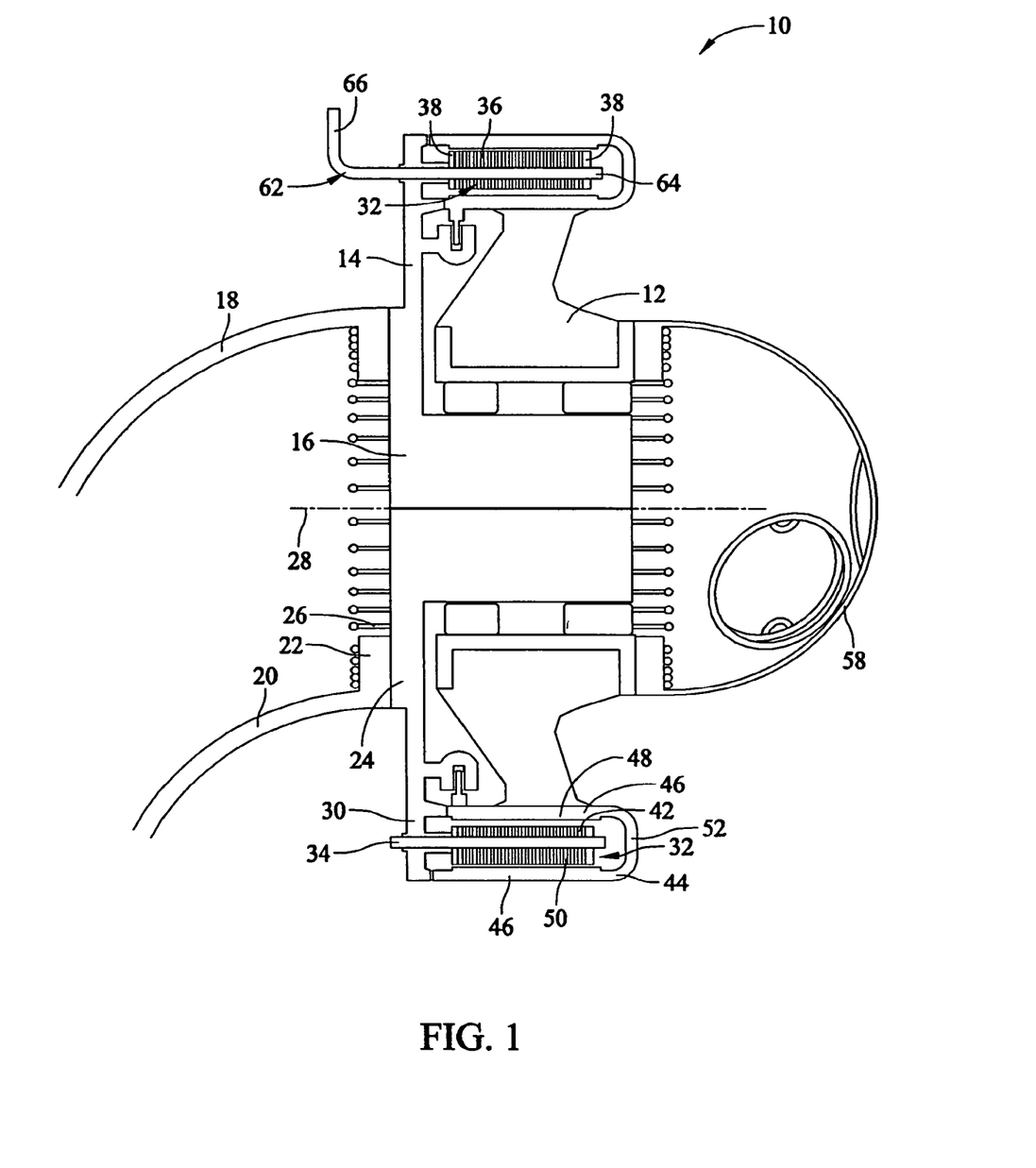
FIG. 1 is a schematic elevation illustration of an exemplary wind turbine generator that includes a rotor and a stator.

FIG. 1 is a schematic elevation illustration of an exemplary wind turbine generator 10 that includes a rotor 12 and a stator 14. Rotor 12 and stator 14 are separated by a bearing 16. In the exemplary embodiment, a base 18 couples to a tower (not shown). Base 18 includes a body 20 and a base flange 22. Stator 14 is configured to couple to base flange 22 through face to face engagement of base flange 22 and a complementary stator flange 24. In the exemplary embodiment, stator 14 is fastened to mating flange 22 through a plurality of bolts 26 spaced circumferentially about a longitudinal axis 28 of generator 10. In an alternative embodiment, stator 14 is fastened to base flange 22 using weldment and/or other fasteners. Stator 14 also includes a core mount rim 30 that extends axially from stator flange 24. In the exemplary embodiment, a stator core 32 is coupled to core mount rim 30 using bolts 34. In one embodiment, stator core 32 includes a plurality of punchings 36, e.g. laminated iron core sections separated by insulative material, extending radially through stator core 32.

Punchings 36 are aligned axially with one another through core 32. Stator core 32 also includes at least one winding or coil 38 surrounding at least a portion of core 32. Coil 38 is used to generate an electrical output of wind turbine generator 10. In the exemplary embodiment, stator core 32 and coil 38 are illustrated as a double-sided stator. Stator core 32 and coil 38 include a radially inner portion 42 and a radially outer portion 44, each portion may be separately excited from magnetic elements 46 coupled to rotor 12. Alternatively, generator 10 is a single-sided stator and includes either inner or outer portion 42 or 44.

In the exemplary embodiment, rotor 12 is illustrated as a double-sided rotor wherein rotor 12 includes at least one magnetic element 46 spaced circumferentially about an outer periphery of a radially inner rotor rim 48 and at least one magnetic element 46 spaced circumferentially about an inner periphery of a radially outer rotor rim 50. Rotor rims 48 and 50 extend axially in parallel with stator core 32. An air gap is defined between portion 42 and magnetic elements 46 coupled to rim 48, and between portion 44 and magnetic elements 46 coupled to rim 50. Uniformity of the air gaps is desirous because the magnetic field generated by magnet elements 46 traverse the air gap to interact with stator windings 38 to generate a voltage in stator windings 38. Rotor rims 48 and 50 may be coupled together at a distal end by a rotor flange 52 that extends radially from radially inner rotor rim 48 to radially outer rotor rim 50.

A hub 58 is coupled to rotor 12. Hub 58 couples to at least one blade (not shown) and transmits loads generated by and/or induced into the blades to rotor 12. Loads transmitted to rotor 12 are transmitted into a rotational movement of rotor 12. Movement of rotor 12 causes magnetic elements 46 to move past stator core 32 and windings 38. This movement generates the electrical output of generator 10. The generation of the electrical output also generates heat in stator core 32, windings 38, and the air gap between stator core 32 and magnetic elements 46. The heat generated may also heat magnetic elements 46, rotor 12, and stator 14. Increased heat causes a degradation in the performance and electrical output of generator 10. Additionally, increased heat may lead to failure or damage of the various components of generator 10. As a result, generator 10 includes a heat pipe assembly 60 to cool the various components of generator 10.

Heat pipe assembly 60 includes a plurality of heat pipes 62 positioned to thermally engage the various components of generator 10, such as, for example, stator core 32 and windings 38, or rotor 12. Each heat pipe 62 includes an evaporator section 64 and a condenser section 66. Evaporator section 64 interfaces with and engages the various components. Heat is absorbed or transferred from the components into evaporator section 64 of heat pipe 62, particularly a vaporizable liquid in heat pipe 62. The heat is then dissipated through condenser section 66 into the ambient environment. In one embodiment, a fluid, such as air, is forced over condenser section 66 to dissipate the heat more quickly.

Figure 2:
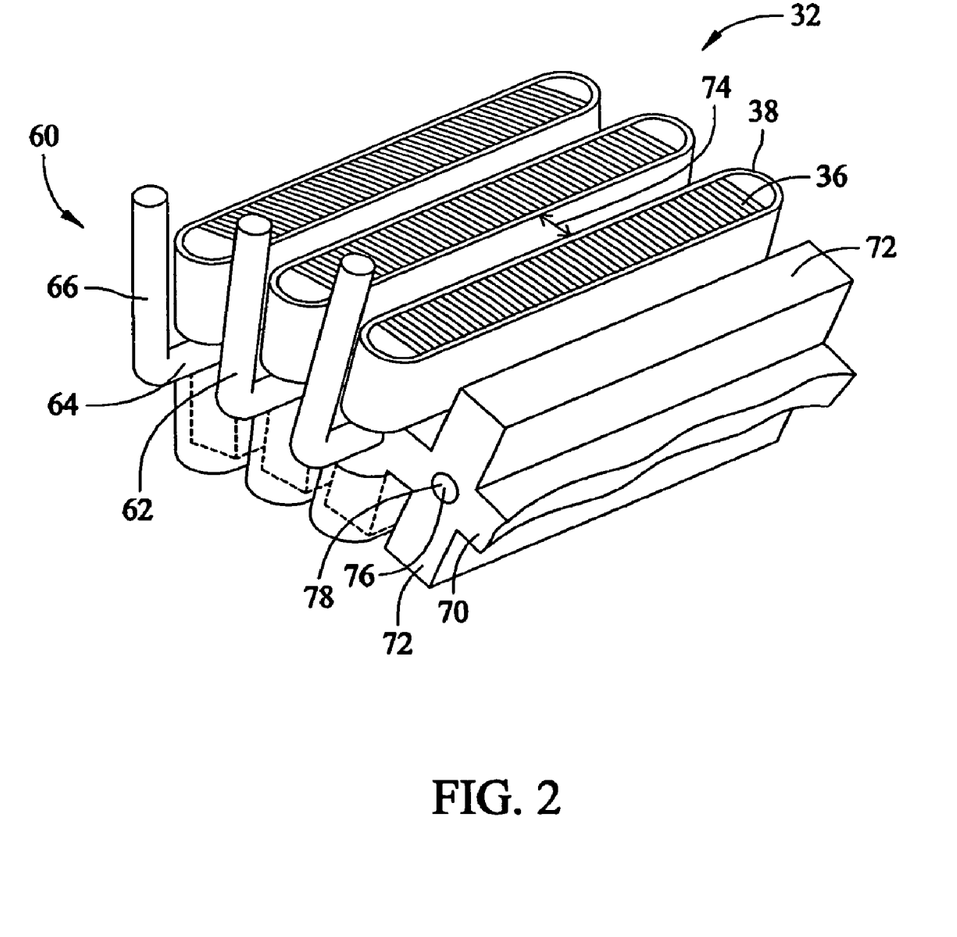
FIG. 2 illustrates a cut-away perspective view of a stator core showing an exemplary embodiment of a heat pipe assembly.

FIG. 2 illustrates a cut-away perspective view of stator core 32 showing an exemplary embodiment of heat pipe assembly 60. Stator core 32 includes a yoke section 70 circumferentially spaced about longitudinal axis 28 and stator teeth 72 extending radially from yoke section 70. Stator core 32 is illustrated as a double-sided core, and as such, includes stator teeth 72 extending radially inward from yoke section 70 and radially outward from yoke section 70. In one embodiment, yoke section 70 and stator teeth 72 are unitarily formed. Alternatively, stator teeth 72 are mounted to yoke section 70. Stator winding 38 is coupled to or mounted on each stator tooth 72. Stator windings 38 are separated from one another by a gap 74 such that adjacent stator windings 38 do not engage one anther. In one embodiment, stator windings 38 engage a portion of yoke section 70. Alternatively, another gap is provided between stator windings 38 and yoke section 70.

Stator teeth 72 and yoke section 70 are defined by a plurality of punchings 36 coupled to one anther. Each punching 36 includes an aperture 76 extending therethrough. In the exemplary embodiment, apertures 76 extend through yoke section 70 of each punching 36, and each aperture 76 is substantially aligned such that a bore 78 extends through stator core 32. Each bore 78 is configured to receive a corresponding heat pipe 62. In one embodiment, heat pipes 62 and bores 78 are rounded. Alternatively, heat pipes 62 and bores 78 have another shape, such as a rectangular, square, triangular, oval or other shape which is complementary to one another. Heat pipe 62 is arranged with respect to stator core 32 such that evaporator section 64 extends into and is received within bore 78, and condenser section 66 is exposed to the ambient environment. Bore 78 is sized such that heat pipe 62 is in thermal communication with stator core 32 and heat is transferred from stator core 32 to condenser section 66. The heat is then axially transferred to condenser section 66. In one embodiment, heat pipe 62 is coated with a thermally conductive material which thermally communicates with stator core 32. In another embodiment, heat pipe 62 is coated with an electrically insulating material such that heat pipe 62 does not electrically engage stator core 32.

In operation, heat generated in stator 14 during the production of electricity by generator 10 (shown in FIG. 1) is dissipated by heat pipe 62. For example, heat is generated in coils 38 and transferred to stator teeth 72. The heat is then transferred to yoke section 70 and then to heat pipe 62. Heat is then dissipated through condenser section 66 of heat pipe 62 to the ambient environment. Additionally, some heat may be generated in stator teeth 72 or yoke section 70 and then dissipated by heat pipe 62.

Figure 3:
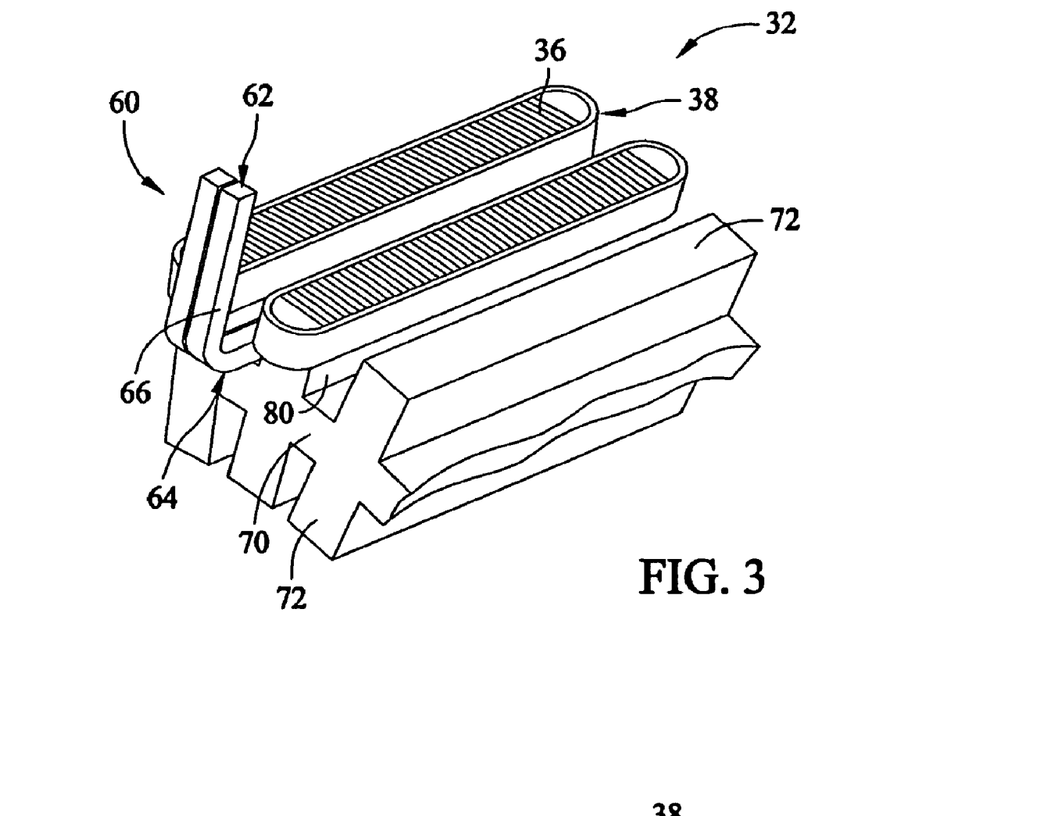
FIG. 3 illustrates a cut-away perspective view of a stator core showing another exemplary embodiment of a heat pipe assembly.

FIG. 3 illustrates a cut-away perspective view of a stator core 32 showing an exemplary embodiment of heat pipe assembly 60. The exemplary embodiment illustrated in FIG. 3 is substantially similar to the embodiment illustrated in FIG. 2, except for the placement and operation of heat pipes 62. Stator core 32 includes yoke section 70 and stator teeth 72. However, yoke section 70 does not include bore 78 (shown in FIG. 2). Stator windings 38 are coupled to each stator tooth 72, and a gap 80 is provided between stator windings 38 and yoke section 70. Heat pipes 62 are positioned between stator windings 38 and yoke sections 70. In the illustrated embodiment, each heat pipe 62 engages a portion of stator core 32, such as stator tooth 72 and/or yoke section 70, and each heat pipe 62 engages a portion of stator winding 38. As such, each heat pipe 62 is configured to directly dissipate heat from each of stator core 32 and winding 38 simultaneously.

In operation, heat generated in stator 14 during the production of electricity by generator 10 (shown in FIG. 1) is dissipated by heat pipe 62. For example, heat is generated in coils 38 and transferred to stator teeth 72. The heat is then transferred to yoke section 70. Heat is dissipated from each of coils 38, stator teeth 72 and yoke section 70 through condenser section 66 of heat pipe 62 to the ambient environment.

Figure 4:
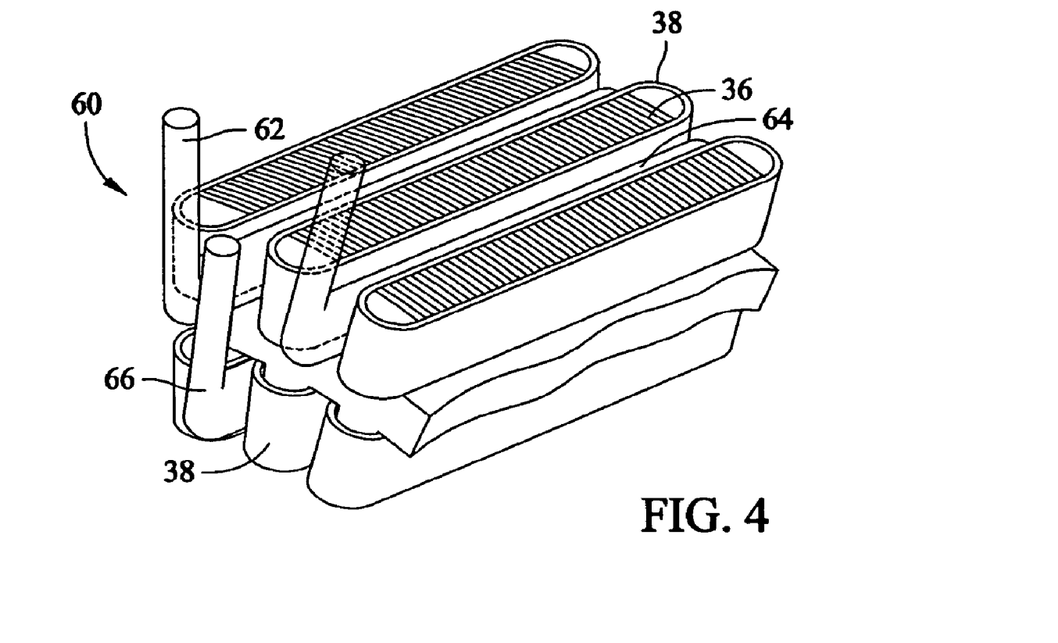
FIG. 4 illustrates a cut-away perspective view of a stator core showing a further exemplary embodiment of a heat pipe assembly.

FIG. 4 illustrates a cut-away perspective view of a stator core 32 showing an exemplary embodiment of heat pipe assembly 60. The exemplary embodiment illustrated in FIG. 4 is substantially similar to the embodiment illustrated in FIG. 3, except for the placement and operation of heat pipes 62. Stator core 32 includes yoke section 70 and stator teeth 72. Heat pipes 62 are positioned between adjacent stator windings 38 such that heat pipes 62 dissipate heat from multiple windings 38 simultaneously. In one embodiment, each heat pipe 62 also engages a portion of stator core 32, such as yoke section 70. As such, each heat pipe 62 is configured to directly dissipate heat from multiple windings 38 and yoke section 70 simultaneously.

In operation, heat generated in stator 14 during the production of electricity by generator 10 (shown in FIG. 1) is dissipated by heat pipe 62. For example, heat is generated in coils 38 and transferred to stator teeth 72. The heat is then transferred to yoke section 70. Heat is dissipated from coils 38 and stator core 32 through condenser section 66 of heat pipe 62 to the ambient environment.

Figure 5:
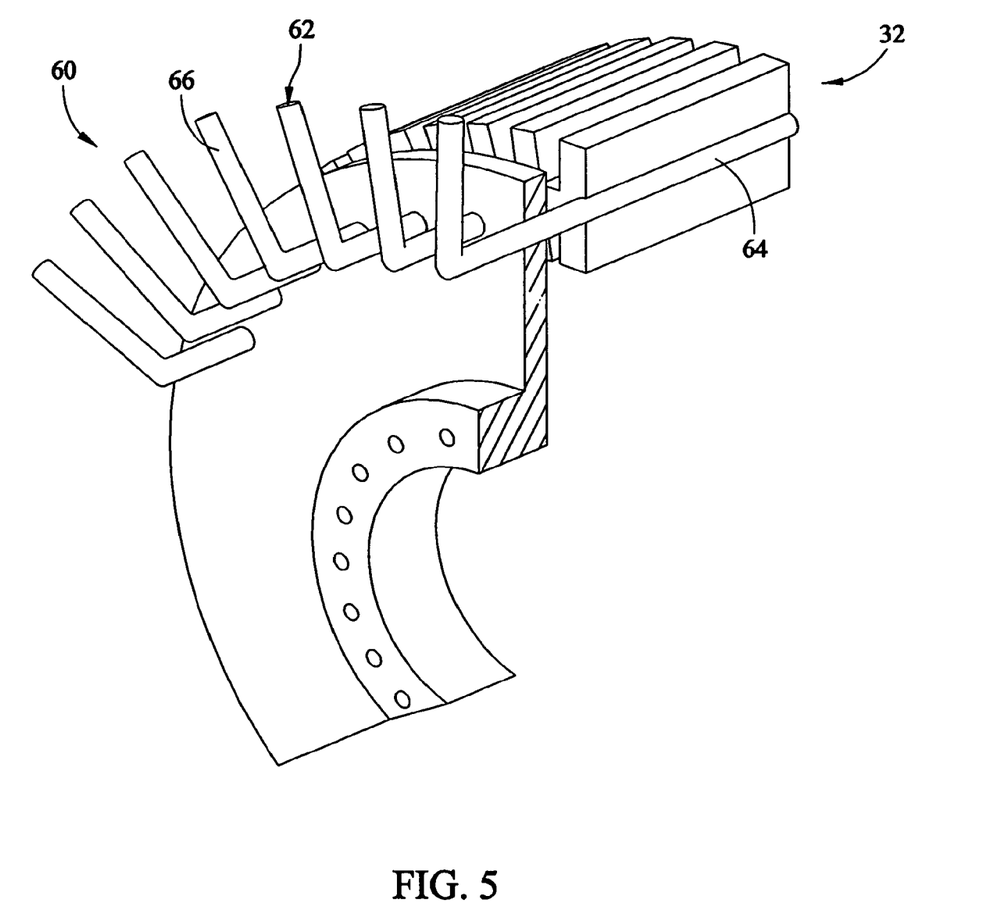
FIG. 5 illustrates a cut-away perspective view of a stator core showing another exemplary embodiment of a heat pipe assembly.

FIG. 5 illustrates a cut-away perspective view of a stator core 32 showing an exemplary embodiment of heat pipe assembly 60. The exemplary embodiment illustrated in FIG. 5 illustrates an orientation of heat pipes 62 with respect to stator core 32. Evaporator section 64 extends axially through stator core 32. Condenser section 66 extends substantially perpendicularly from evaporator section 64. Additionally, condenser section 66 extends radially outward with respect to longitudinal axis 28. As such, condenser section 66 extends substantially parallel to corresponding stator teeth 72.

Figure 6:
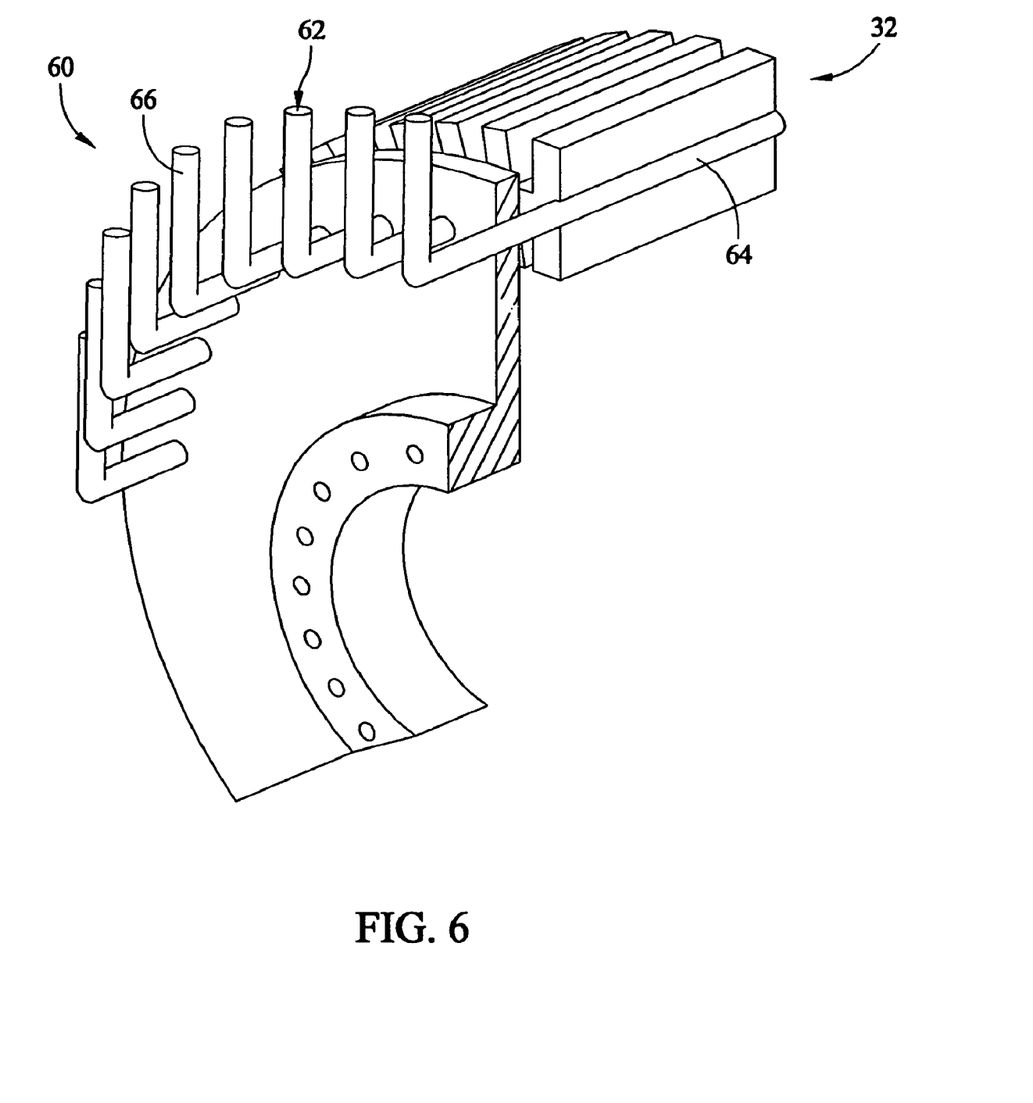
FIG. 6 illustrates a cut-away perspective view of a stator core showing yet another exemplary embodiment of a heat pipe assembly.

FIG. 6 illustrates a cut-away perspective view of a stator core 32 showing an exemplary embodiment of heat pipe assembly 60. The exemplary embodiment illustrated in FIG. 6 illustrates an orientation of heat pipes 62 with respect to stator core 32. Evaporator section 64 extends axially through stator core 32. Condenser section 66 extends substantially perpendicularly from evaporator section 64. Additionally, condenser section 66 extends substantially vertically upward from evaporator section 64. As such, gravity assists condensation within condenser section 66.

Figure 7:
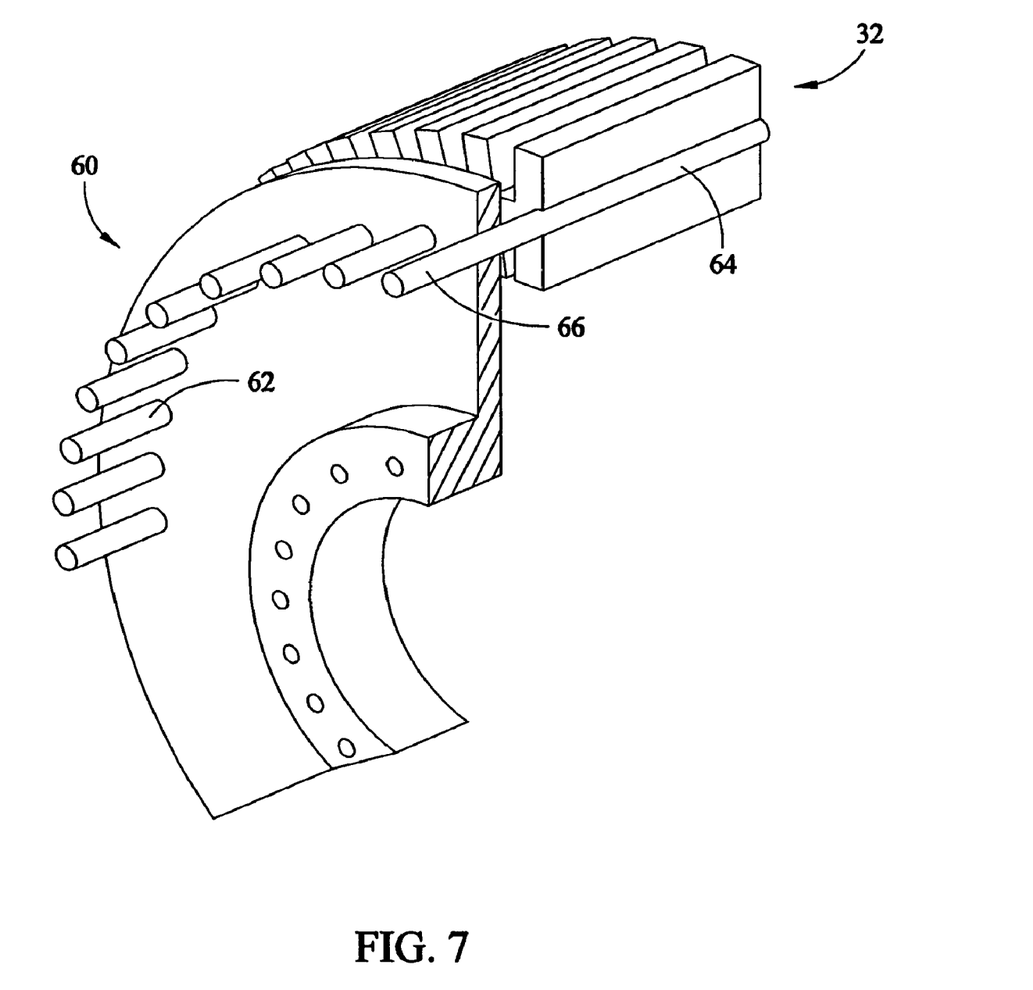
FIG. 7 illustrates a cut-away perspective view of a stator core showing yet a further exemplary embodiment of a heat pipe assembly.

FIG. 7 illustrates a cut-away perspective view of a stator core 32 showing an exemplary embodiment of heat pipe assembly 60. The exemplary embodiment illustrated in FIG. 7 illustrates an orientation of heat pipes 62 with respect to stator core 32. Evaporator section 64 extends axially through stator core 32. Condenser section 66 extends axially outward from evaporator section 64.

Figure 8:
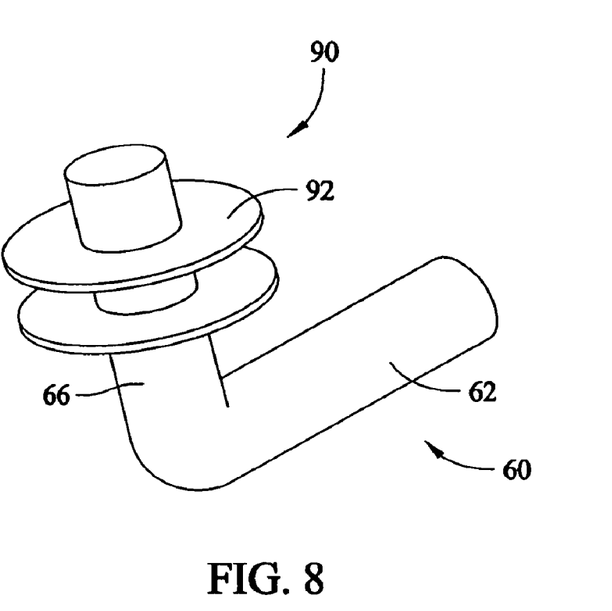
FIG. 8 illustrates a perspective view of an exemplary fin structure for a heat pipe assembly.

FIG. 8 illustrates a perspective view of an exemplary fin structure 90 for heat pipe assembly 60. Fin structure 90 is attached to and in thermal communication with heat pipes 62 at condenser section 66. Fin structure 90 facilitates dissipating heat from heat pipes 62 and facilitates condensing the vaporizable liquid in heat pipes 62. In one embodiment, fin structure 90 includes a disk 92 having a planar body extending outward from condenser section 66. In one embodiment, multiple disks 92 are attached to each heat pipe 62.

Figure 9:
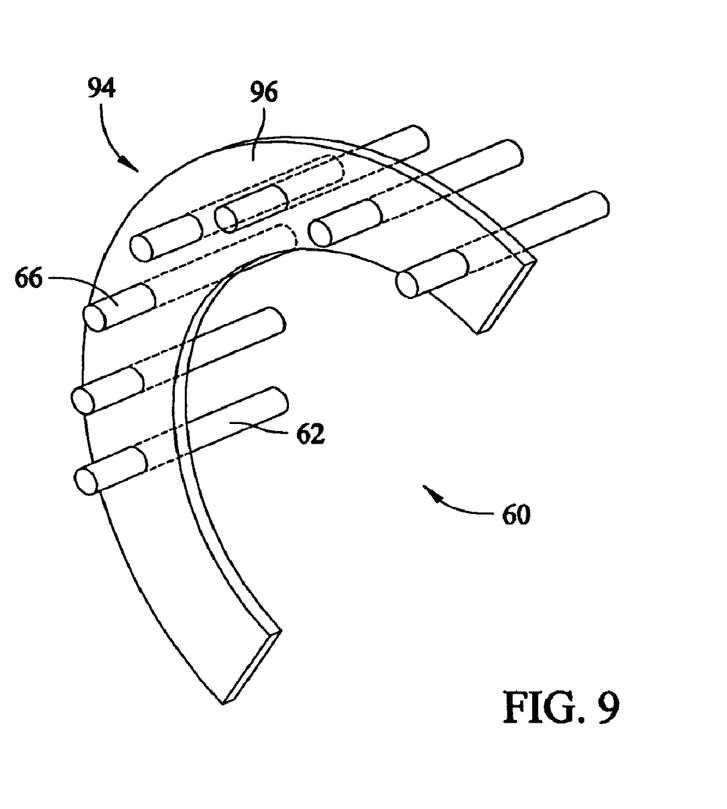
FIG. 9 illustrates a cut-away perspective view of another exemplary fin structure for a heat pipe assembly.

FIG. 9 illustrates a cut-away perspective view of another exemplary fin structure 94 for heat pipe assembly 60. Fin structure 94 includes a ring 96 extending circumferentially around longitudinal axis 28. Ring 96 is in thermal communication with each heat pipe 62.

As such, a generator for a wind turbine is provided having a heat pipe assembly to facilitate cooling in a cost effective and reliable manner. The generator includes a rotor and a stator. The stator has a core and coils attached to the core. The rotor includes magnetic elements which interact with the core and coils to generate a current in the core and coils. The current is used to generate an electrical output. When the electrical output is generated, the various components in the stator and/or rotor are heated. To cool the various components, the heat pipe assembly is provided. Various embodiments and configurations of a heat pipe assembly are provided to dissipate the heat from the components in a cost effective and reliable manner. For example, the heat pipes do not include any moving parts and do not require any power to facilitate cooling. As a result, maintenance and operating costs are reduced. Additionally, the heat pipes are compact.

Exemplary embodiments of a generator and a heat pipe assembly are described above in detail. The generator and assemblies are not limited to the specific embodiments described herein, but rather, components of each may be utilized independently and separately from other components described herein. For example, each generator or heat pipe assembly component can also be used in combination with other generator or heat pipe components.

While the invention has been described in terms of various specific embodiments, those skilled in the art will recognize that the invention can be practiced with modification within the spirit and scope of the claims.

What is claimed is:

1. A wind turbine generator comprising:
a stator comprising a core and a plurality of stator windings circumferentially spaced about a generator longitudinal axis;
a rotor rotatable about the generator longitudinal axis, said rotor comprising a plurality of magnetic elements coupled to said rotor and cooperating with said stator windings, said magnetic elements configured to generate a magnetic field, said stator windings configured to interact with the magnetic field to generate a voltage in said stator windings; and
a heat pipe assembly thermally engaging said stator to dissipate heat generated in said one of said stator and said rotor, said heat pipe assembly comprising a condenser section that extends radially outward with respect to a longitudinal axis of said generator.

2. A wind turbine generator in accordance with claim 1 wherein said wind turbine generator is a double sided generator.

3. A wind turbine generator in accordance with claim 1 wherein said heat pipe assembly thermally engages said stator, said core includes a yoke section circumferentially spaced about the generator longitudinal axis, said heat pipe assembly comprising a plurality of heat pipes extending axially through said yoke section.

4. A wind turbine generator in accordance with claim 1 wherein said heat pipe assembly thermally engages said stator, said core includes a yoke section circumferentially spaced about the generator longitudinal axis and suitor teeth extending radially from the yoke section, said stator windings surrounding each of said stator teeth, said heat pipe assembly comprising a plurality of heat pipes extending between and engaging said yoke section and a corresponding stator winding.

5. A wind turbine generator in accordance with claim 1 wherein said heat pipe assembly thermally engages said stator, said core includes a yoke section circumferentially spaced about the generator longitudinal axis and stator teeth extending radially from the yoke section, said stator windings surrounding each of said stator teeth, said heat pipe assembly comprising a plurality of heat pipes, each heat pipe positioned between adjacent stator windings for dissipating the heat generated in said stator windings.

6. A wind turbine generator in accordance with claim 1 wherein said heat pipe assembly thermally engages said stator, said heat pipe assembly comprises a plurality of heat pipes, each said heat pipe comprising an evaporator section and a condenser section, said evaporator section engaging said core and said condenser section extending outward from said core.

7. A wind turbine generator in accordance with claim 6 wherein said condenser section extends axially outward from said core.

8. A wind turbine generator in accordance with claim 6 wherein said condenser section extends radially outward from said evaporator section.

9. A wind turbine generator in accordance with claim 6 wherein said condenser section extends vertically upward from said evaporator section.

10. A wind turbine generator in accordance with claim 1 wherein said heat pipe assembly comprises a fin structure.

11. A wind turbine generator in accordance with claim 1 wherein said heat pipe assembly is cooled by forcing a fluid over said condenser section of said heat pipe assembly.

12. A generator for a wind turbine, said generator comprising:
   a stator core;
   a plurality of coils coupled to said core, said coils configured to generate an electrical output of the generator; and
   a heat pipe assembly thermally engaging at least one of said core and said plurality of coils, said heat pipe assembly comprises a condenser section that extends radially outward with respect to a longitudinal axis of said generator, said heat pipe assembly configured to dissipate heat generated in said core and said plurality of coils.

13. A generator in accordance with claim 1 wherein said core includes a yoke section circumferentially spaced about a generator longitudinal axis, said heat pipe assembly comprising a plurality of heat pipes extending axially through said yoke section.

14. A generator in accordance with claim 13 wherein said core further comprises stator teeth extending radially from the yoke section, said plurality of coils surrounding said stator teeth, said heat pipe assembly engaging each said coil.

15. A generator in accordance with claim 13 wherein said heat pipe assembly comprises a plurality of heat pipes, each said heat pipe comprising an evaporator section and a condenser section, said evaporator section engaging said core and said condenser section extending outward from said core.

16. A generator in accordance with claim 15 wherein said condenser section extends one of an axially outward direction, a radially outward direction, a radially inward direction, and a vertically upward direction with respect to said evaporator section.

17. A generator in accordance with claim 13 wherein said heat pipe assembly comprises a fin structure.

\* \* \* \* \*